April 5, 1955 K. UNHOLTZ 2,705,761
CLAMPING CONSTRUCTION FOR ELECTROMAGNETIC VIBRATION EXCITER
Filed Nov. 26, 1951 3 Sheets-Sheet 1

Inventor
Karl Unholtz
By his attorneys
Howson and Howson

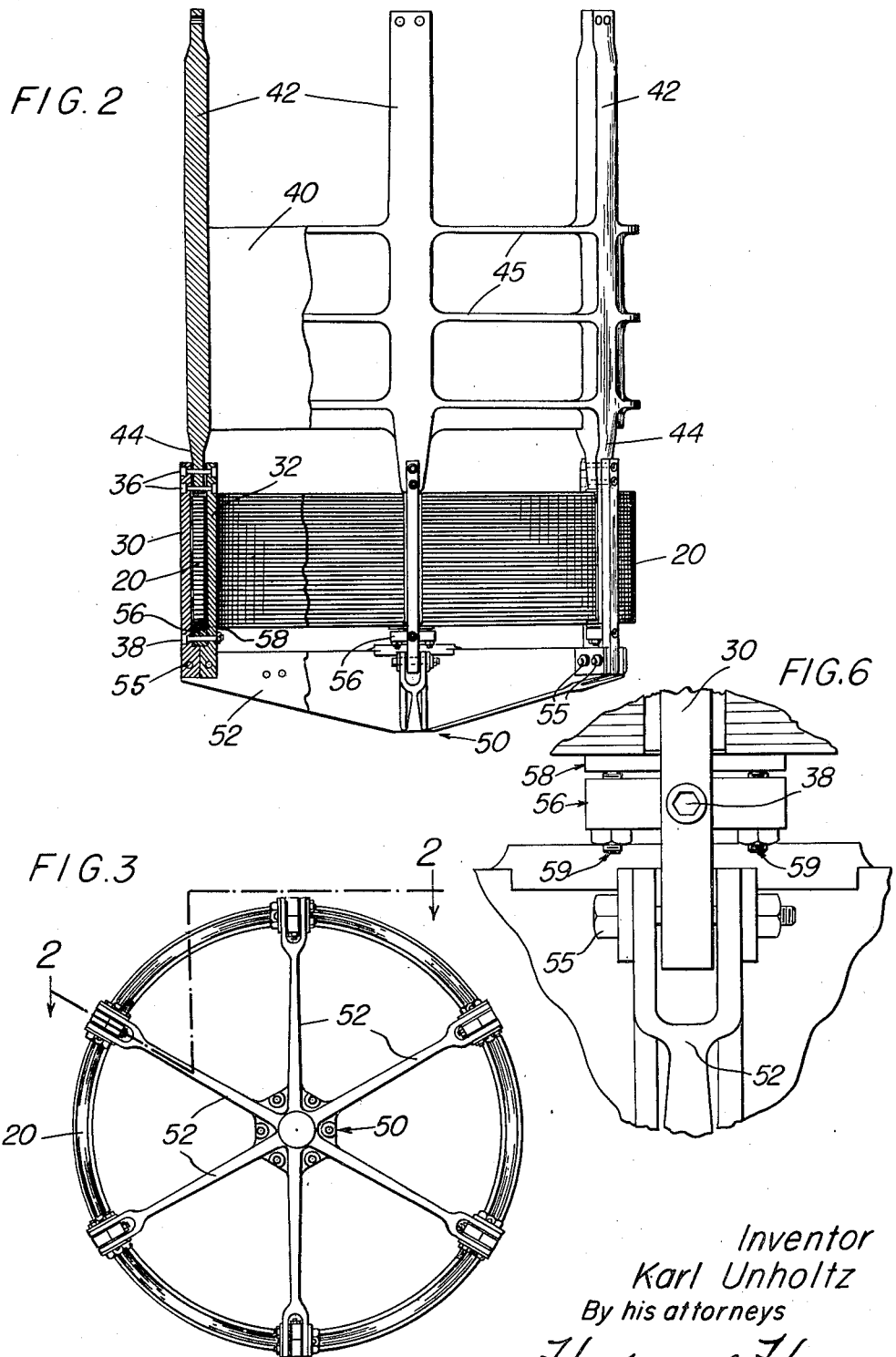

April 5, 1955 K. UNHOLTZ 2,705,761
CLAMPING CONSTRUCTION FOR ELECTROMAGNETIC VIBRATION EXCITER
Filed Nov. 26, 1951 3 Sheets-Sheet 3

Inventor
Karl Unholtz
By his attorneys
Howson and Howson

United States Patent Office 2,705,761
Patented Apr. 5, 1955

2,705,761

CLAMPING CONSTRUCTION FOR ELECTRO-MAGNETIC VIBRATION EXCITER

Karl Unholtz, Woodbridge, Conn., assignor to The MB Manufacturing Company, Inc., New Haven, Conn., a corporation of Connecticut Application November 26, 1951, Serial No. 258,277

8 Claims. (Cl. 310—27)

This invention relates to an electromagnetic vibration exciter and more particularly to a clamping construction for the driver coil which may be used in large size vibration exciters.

In such exciters, it has been found desirable to locate the table on which the specimen to be tested is mounted at one end of the exciter and to locate the driver coil at the opposite end. That is done to remove the table from the area of the high density magnetic field. The presence of that magnetic field has been found to be increasingly troublesome as the size of the exciter increased. The general shape of the magnetic structure in exciters of this sort as heretofore used has provided a region of lowest flux density at a point in the apparatus opposite to the annular air gap in which the driver coil is located. If the table were to be located at the same end as the annular air gap and driver coil, the table would have to be sufficiently far removed from the driver coil to minimize flux disturbances. In utilizing current designs, the resulting structure would have to have approximately the same height or dimensions as would be necessary in mounting the coil at the opposite end. Hence, in consideration of the foregoing factors, the table in the present invention is located at the opposite end of the apparatus from the air gap and the driver coil. This separation of the driver coil from the table magnifies the problem of making the connection between the driver coil and the table as rigid as possible. In order to achieve good dynamic performance of the exciter and to provide for the most satisfactory axial and rotational deflections such rigidity is greatly to be desired. One of the difficulties which arises in attempting to provide optimum rigidity lies at the point where the driver coil joins the means which connect it to the table.

Therefore it is an object of the invention to provide an improved connection between the driver coil and the table in an electromagnetic vibration exciter wherein the table and driver coil are at opposite ends of the field coil.

Another object is to provide an improved connection of the foregoing type providing a straight-line connection from the coil to the table.

Another object is to provide a connection of the foregoing type of which the parts may be assembled from fabricated metallic elements of simple form and which will long maintain its rigidity under arduous conditions and strenuous use.

Other objects and advantages of the invention will appear as it is described in connection with the accompanying drawings.

In the drawings:

Fig. 2 is a side elevation view partly in section taken along line 2—2 of Fig. 3 of the driver coil assembly;

Fig. 3 is a bottom view of the driver coil assembly of Fig. 2.

Fig. 6 is a detail elevational view of the connection of the driver coil, clamping and spider members.

Figure 1:
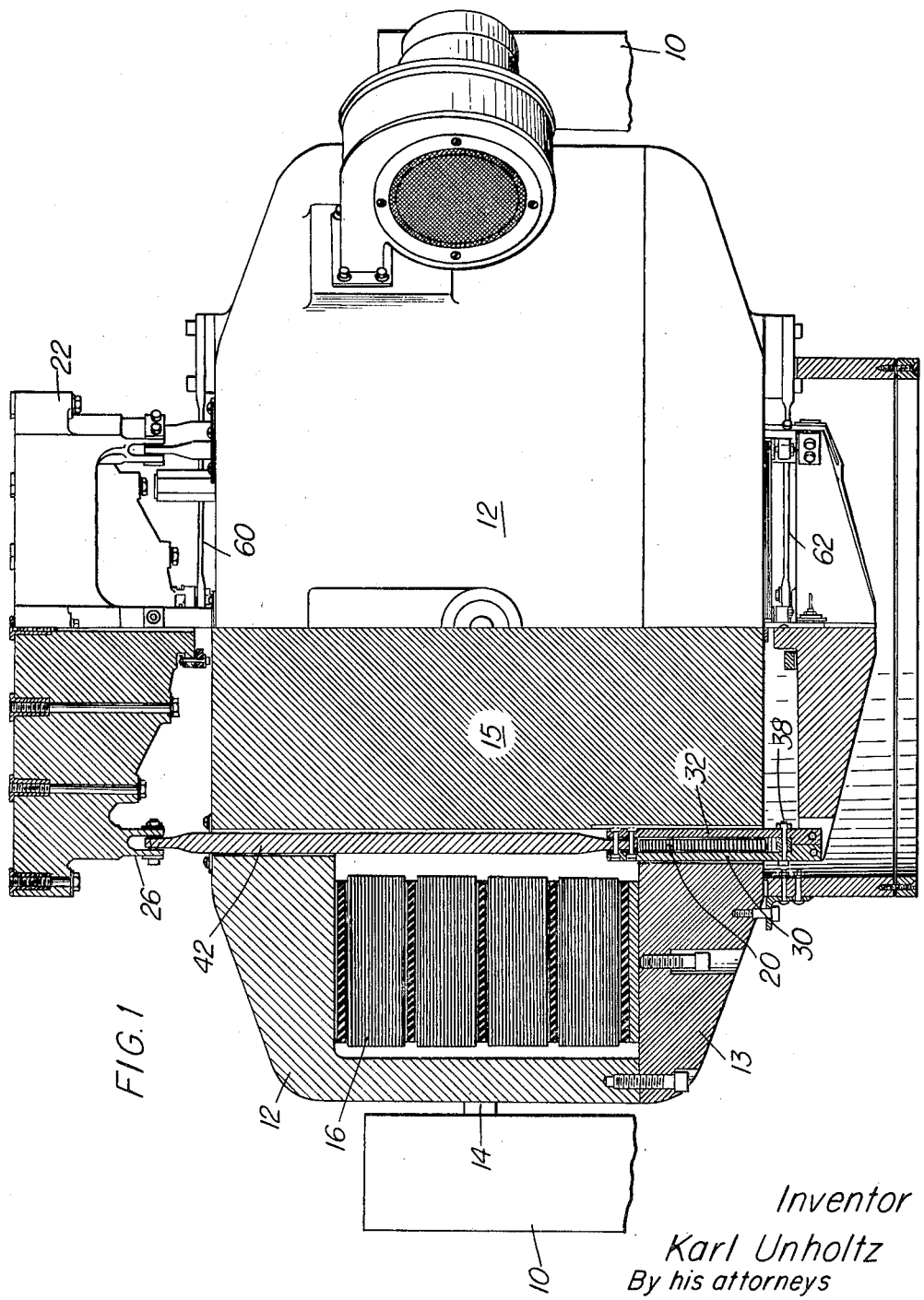
Fig. 1 is a side elevation view partly in section of a vibration exciter embodying the invention.
Figure 4:
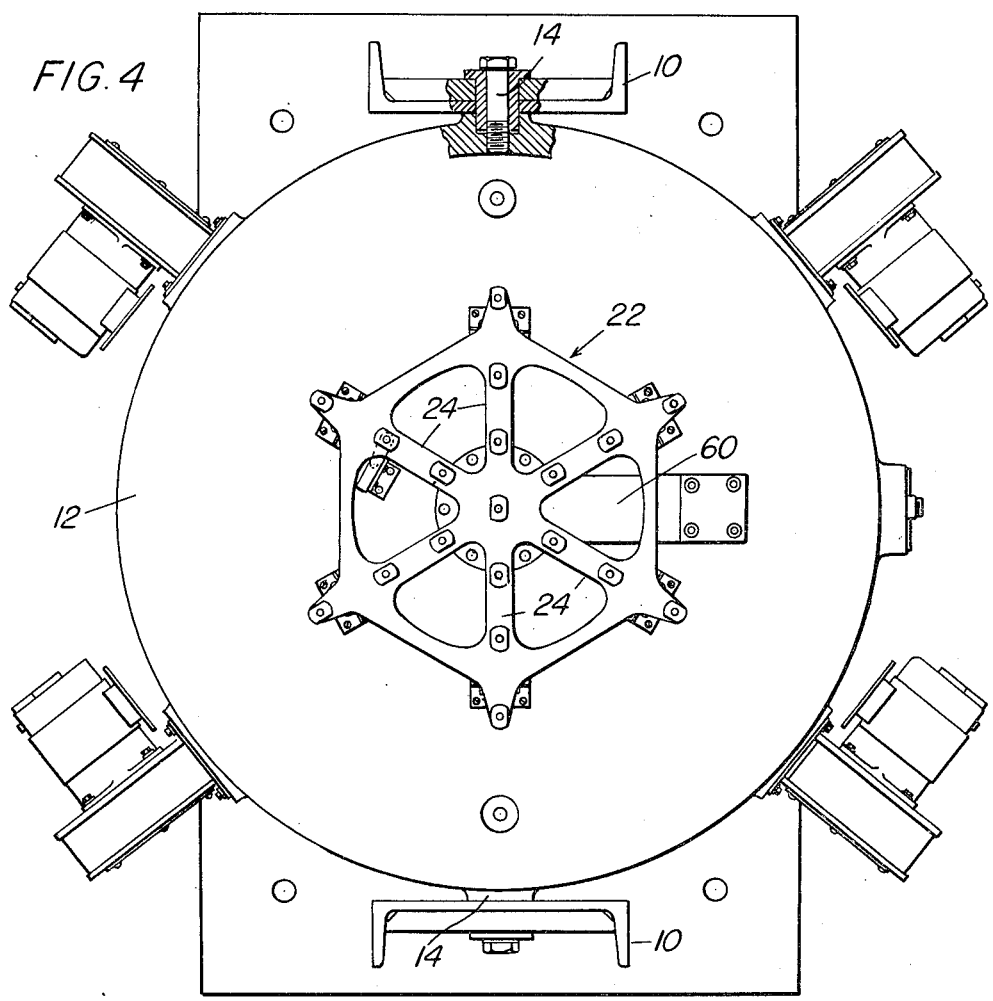
Fig. 4 is a top plan view of the vibration exciter.
Figure 5:
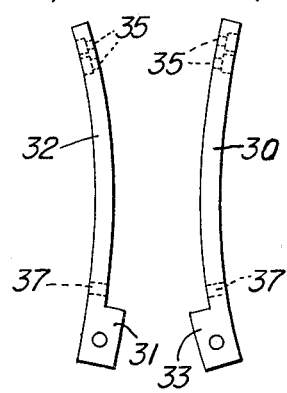
Fig. 5 is a detail view in elevation of the clamp members.

Referring to the machine as positioned in Fig. 1 of the drawings, spaced vertical channel members 10 form columns which support a cylindrical housing 12 of magnetic material on trunnions 14. Forming the bottom part of the housing is an annular member 13 which is bolted on the main housing part 12. Within the housing is an annular electromagnetic coil 16 located in an annular passageway between the outer part of the housing 12 and the central cylindrical core part 15 thereof. One side of the annular coil 16 is shown in section, in Fig. 1. The coil may be built up conventionally of several serially connected sections, as shown, if desired. It is supported on the bottom part 13 and may be energized from any suitable source of direct current in usual fashion.

Within the bottom housing part 13 is a driver coil 20 which may consist of a strip of metallic ribbon, or equivalent coil structure, helically wound with the broad face of the ribbon perpendicular to the axis of the main coil. Within the central area of the driver coil is an extension of the core 15, the core being a part of housing 12. The driver coil is supplied with variable alternating currents through electric connections in any usual or suitable manner.

The convolutions of the driver coil are insulated and clamped together at a plurality of equidistant spaced points, six being a preferred number, but the invention is not limited in that respect. Each clamp comprises two similar clamping members 30, 32, each comprising a bar or strip of metal preformed into an arc of relatively large radius of curvature. Extending laterally or radially outward on the convex side at one end (the bottom end) of each member is a rectangular enlargement 31, 33. Formed in the top ends of each clamp member are holes 35 for bolts 36 for drawing the members together against inner and outer faces of the coil respectively. For a similar purpose, holes 37 are provided near the bottom ends of the clamps for a bolt 38.

Due to the curvature of the clamps, when they are placed with their convex sides facing the inner and outer coil surfaces and tightened by bolts 36 and 38, the coil will be clamped at mid-height as well as at the top and bottom portions and will thus be firmly held throughout its entire height.

Above the housing 12 is a table 22 which may comprise a hexagonal metal frame having radial arms 24 extending to the periphery, at which points bifurcated lugs 26 extend down.

A rigid connection along straight parallel lines from the clamps 32—30 to the table lugs 26 is provided by an open ended cylinder 40 which has integral arms 42 extending up at spaced points around the top peripheral edge, their number and position being equal to those of table lugs 26 and also equal to the number of clamps. The upper ends of the arms 42 are bolted to the lugs 26 forming a rigid connection between the table and cylinder. The cylindrical portion 40 of the connecting structure is located within the housing 12 adjacent the main coil 16, while the arms 42 extend through the top of the housing.

Depending from the lower peripheral edge of the cylinder are integral feet 44 equal in number and position to the arms 42 and to the clamps. These feet are bolted by the clamping bolts 36 to the upper ends of the clamps. Gaskets may be inserted between the adjacent surfaces of the feet and the clamping members to insure rigidity of the joint.

To strengthen and make more rigid the cylinder 40, spaced reinforcing peripheral ribs 45 may be formed around its outer peripheral surface.

Rigidity of the bottom edge of the driver coil 20 is provided by joining the lower ends of the clamps to the bifurcated ends of radial legs 52 of a spider member 50. Holes are provided in the ends of the clamping members 32, 30 for bolts 55 by which the bifurcated leg ends are rigidly secured to the clamping members.

In order to rigidly secure the driver coil vertically within the clamps 30, 32, a metallic bridge block 56 is seated on the horizontal surface provided by the clamping together of the enlargements 31 of the clamps 30, 32. It is held between the clamps 30, 32 by bolt 38 which passes freely through it, but it is otherwise freely movable within the space between the clamps. Above the bridge is an insulated metal pressure plate 58 which is pressed against the bottom of the driver coil by two vertical adjustment screws 59 threaded through parallel threaded holes in the bridge block 56 and locked by lock nuts. In that way, the coil 20 can be firmly and rigidly held within the clamps 30, 32.

The whole assembly of table, driver coil and connecting structure is mounted resiliently for vibration on two stiff but flexible, radial bars 60, 62 each mounted at one end on the housing 12, the other end of one (60) being bolted to the center of the table 22, and the other end of the other (62) being bolted to the outer end of the spider 50.

It is desirable to be able to assemble into the exciter the combination of the cylinder 40, the driver coil, and the clamping members, as a unit, before the attachment of the table and spider thereto. It is also desirable to be able to tighten the adjustable parts, such as the clamping bolts 36, 38 and screws 59 prior to such assembling. Those aims are satisfied in the present construction, with the result that after the table and spider are connected to the cylinder and clamps respectively, no further adjustments need be made of the parts which hold the driver coil rigidly. But should adjustments be needed at a later date, the bridge block adjustment screws 59 are accessible for that purpose; but neither they nor the bridge block 56 are dependent on other attachments on fixed parts of the exciter.

From the foregoing, it may be seen that I have provided a rigid, integrated structure connecting the driver coil and the vibration table 22 along straight lines with the table remote from the strong magnetic field within which the driver coil operates.

Modifications within the scope of the invention will occur to those skilled in the art. Therefore the invention is not limited to the details of the specific embodiment illustrated.

What I claim is:

1. In a vibration exciter, means for establishing a magnetic field, means near one end of the field-establishing means to support articles to be vibrated, a driver coil near the other end of the field-establishing means, rigid connecting structure between said driver coil and said article-supporting means comprising a hollow cylindrical portion including means extending in straight-lines toward and connected with said article-supporting means adjacent its periphery, means to secure said connecting structure to said driver coil rigidly around its periphery, and a member on that side of said driver coil remote from said connecting structure having elements diametrically spanning the driver coil and imparting radial rigidity thereto.

2. In a vibration exciter, means for establishing a magnetic field surrounded by a housing of magnetic material, means at one end of the housing to support articles to be vibrated, a driver coil at the other end of said housing, a plurality of means to clamp the convolutions of said coil, a rigid straight-line connecting structure from one end of said clamping means to said supporting means, and a rigid spider member with radial arms connected to the other ends of said clamping means to impart radial rigidity to the lower end of said driver coil.

3. Clamping means for the driver coil of a vibration exciter comprising arcuate clamping members, and means to clamp said members against the outer periphery and inside surface of said coil with the convex sides of said clamping members facing the coil, and means providing for attachment to said clamping means of a connection to a vibration table.

4. Clamping means for the driver coil of a vibration exciter comprising arcuate clamping members, and means to clamp said members against the outer periphery and inside surface of said coil with the convex sides of said clamping members facing the coil, a pressure member adapted to be pressed against the end convolutions of the coil, means supported by said clamping members and adjustable to apply pressure against said pressure member to rigidly hold said coil within said clamping members, and means providing for attachment to said clamping means of a connection to a vibration table.

5. Clamping means for the driver coil of a vibration exciter comprising arcuate clamping members, and means to clamp said members against the outer periphery and inside surface of said coil with the convex sides of said clamping members facing the coil, a pressure plate passing freely through said clamping member, a bridge member supported between said clamping members, and adjustable means carried by said bridge member for applying pressure against said pressure plate, and means providing for attachment to said clamping means of a connection to a vibration table.

6. Clamping means for a driver coil of a vibration exciter comprising clamping members, means to clamp said members against the outer periphery and inside surfaces of said coil, a pressure member adapted to be pressed against the end convolutions of the coil, means supported by said clamping members and adjustable to apply pressure against said pressure member to rigidly hold said coil within said clamping members, and means providing for attachment to said clamping means of a connection to a vibration table.

7. Clamping means for the driver coil of a vibration exciter comprising clamping members, means to clamp said members against the outer periphery and inside surfaces of said coil, a pressure plate passing freely through said clamping members, a bridge member supported between said clamping members, and adjustable means carried by said bridge member for applying pressure against said pressure plate, and means providing for attachment to said clamping means of a connection to a vibration table.

8. Clamping means for the driver coil of a vibration exciter comprising arcuate clamping members, and means to clamp said members against the outer periphery and inside surface of said coil with the convex sides of said clamping members facing the coil, said clamping members having lateral extensions from their convex faces cooperating in clamped position to form a supporting surface, pressure applying means supported from said surface, and a pressure plate to transmit the pressure of said applying means to said coil in a direction perpendicular to the clamping action of said clamping members, and means providing for attachment to said clamping means of a connection to a vibration table.

References Cited in the file of this patent

UNITED STATES PATENTS

| | | |
|---|---|---|
| 2,163,404 | Mead, Jr. | June 20, 1939 |
| 2,599,036 | Efromson et al. | June 3, 1952 |